United States Patent [19]

Kurata et al.

[11] Patent Number: 4,546,381

[45] Date of Patent: Oct. 8, 1985

[54] MULTI-FUNCTION COPYING MACHINE

[75] Inventors: Masami Kurata; Takashi Ohmori, both of Kanagawa, Japan

[73] Assignee: Fuji Xerox Co., Ltd., Tokyo, Japan

[21] Appl. No.: 472,323

[22] Filed: Mar. 4, 1983

[30] Foreign Application Priority Data

Mar. 8, 1982 [JP] Japan .................................. 57-35174

[51] Int. Cl.$^4$ ................................................ H04N 1/46

[52] U.S. Cl. .......................................... 358/78; 358/75

[58] Field of Search ................. 358/77, 78, 75; 355/4, 355/12; 346/76 PH

[56] References Cited

U.S. PATENT DOCUMENTS 3,819,854 6/1974 Kolb ........................................ 358/78

4,476,486 10/1984 Ayata .................................... 358/78

*Primary Examiner*—Michael A. Masinick

*Attorney, Agent, or Firm*—and Seas Sughrue, Mion, Zinn, Macpeak

[57] ABSTRACT

A multi-function copying machine having a reading section for reading picture data on an original by raster scanning. A recording section has a plurality of recording devices adapted to perform recording at different recording positions. The recording section applies to the recording devices a picture signal for each color for multi-color recording or a picture signal for each side of the original for two-side recording. Recording control is achieved by a control system for controlling the timing of delivery of the picture signal applied to the recording devices. An editing control circuit sets the timing of delivery of a part of the picture signal provided by the reading section to the recording section, for editing the picture data on the original. A memory delays the timing of delivery of a predetermined picture signal to the recording section according to the timing of delivery set by the control system.

11 Claims, 10 Drawing Figures

61
ON
62
OFF
63
POWER
64
CLR
68
0
1
2
3
4
5
6
7
8
9
65
66
67
TROUBLE
72
STOP
71
START
69
B4
73
A4
74
BLACK
75
RED
76
MAG
84
MODE
83
MF (1)
93
MF (2)
94
NORMAL
85
ALL BLACK
86
RED CUT
87
125%
88
100%
89
75%
91
NORMAL COLOR
81
LIGHT COLOR
82
DARK COLOR
77
NORMAL COLOR
78
LIGHT COLOR
79
ARRANGE-MENT CHANGE
97
MULTI -COPY
99
OVER-LAPPING
102
TWO -COLORING
104
107
108
109

MULTI-FUNCTION COPYING MACHINE

BACKGROUND OF THE INVENTION

This invention relates to a multi-function copying machine capable of editing picture data. In a copying machine in which an original is read by raster scanning and is copied by a recording head such as a thermal head, multi-color recording or recording both sides of an original (herein two-side recording) is carried out by using a plurality of recording heads.

FIG. 1 illustrates schematically the principle of a copying machine which performs two-color recording utilizing the technique of thermal transfer. In this copying machine, first and second thermal heads 2 and 3 are spaced by a predetermined distance from each other on one side of a recording sheet 1 conveying path. For instance, a black recording ink donor sheet 4 is supplied to the first thermal head 2, while a red recording ink donor sheet 5 is supplied to the second thermal head 2. Pressure rollers 6 and 7 are provided on the opposite side of the recording sheet conveying path to push the recording sheet 1 against the thermal heads 2 and 3.

In this copying machine, the recording sheet 1 is moved in the direction of the arrow (right to left), so that black recording is carried out by the first thermal head 2 and red recording is performed by the second thermal head 3. The thermal heads 2 and 3 are somewhat shifted in the direction of movement of the recording sheet 1 (in the auxiliary scanning direction). Although the thermal heads are shifted as described above, coincidence of the recording positions is essential. For this purpose, a memory 8 is employed in which red picture data are temporarily stored.

FIG. 2 illustrates schematically the principle of a copying machine which performs two-side recording. In this copying machine, a first thermal head 2 is disposed on one side of the recording sheet 1 conveying path and a second thermal head 3 is disposed on the other side of the conveying path. The same recording color ink donor sheets 9A and 9B are generally supplied to the two thermal heads 2 and 3, that is, monotone copying takes place.

In the copying machine of FIG. 2, two-side recording is carried out by moving the recording sheet 1 in the direction of the arrow and driving the two thermal heads 2 and 3. In general, an original is read in such a manner that, after one side is read, the other side is read. Accordingly, it is necessary for a memory 8 to store picture data which are to be recorded by, for instance, the second thermal head 3.

Most of the copying machines which carry out multi-color recording or the like by digital signal processing employ a relatively large capacity memory to store picture data, as described above. However, the memory of this type is used only for its original primary purpose of delaying picture signals. Thus, the efficiency of use thereof is low, which makes the copying machine relatively expensive relative to its scope of utilization.

SUMMARY OF INVENTION

In view of the foregoing difficulties in the prior art, an object of this invention is to provide a multi-function copying machine in which picture data can be edited by the use of the above-described memory.

Another object of this invention is to provide a multi-function copying machine with expanded functionality in terms of data shifting for printing, and yet not materially increasing the cost or complexity of the system.

The foregoing and other objects of the invention have been achieved by allowing the above-described copying machine to have a picture reading section which can read data in a desired range in the auxiliary scanning direction, a recording section which can record data in a desired range in the auxiliary scanning direction, and a control circuit for controlling the writing and reading operations of the memory.

This invention will be described in greater detail by referring to the drawing and the description of the preferred embodiment that follows.

DESCRIPTION OF THE PREFERRED EMBODIMENT

This invention will now be described with reference to its preferred embodiment.

Figure 3:
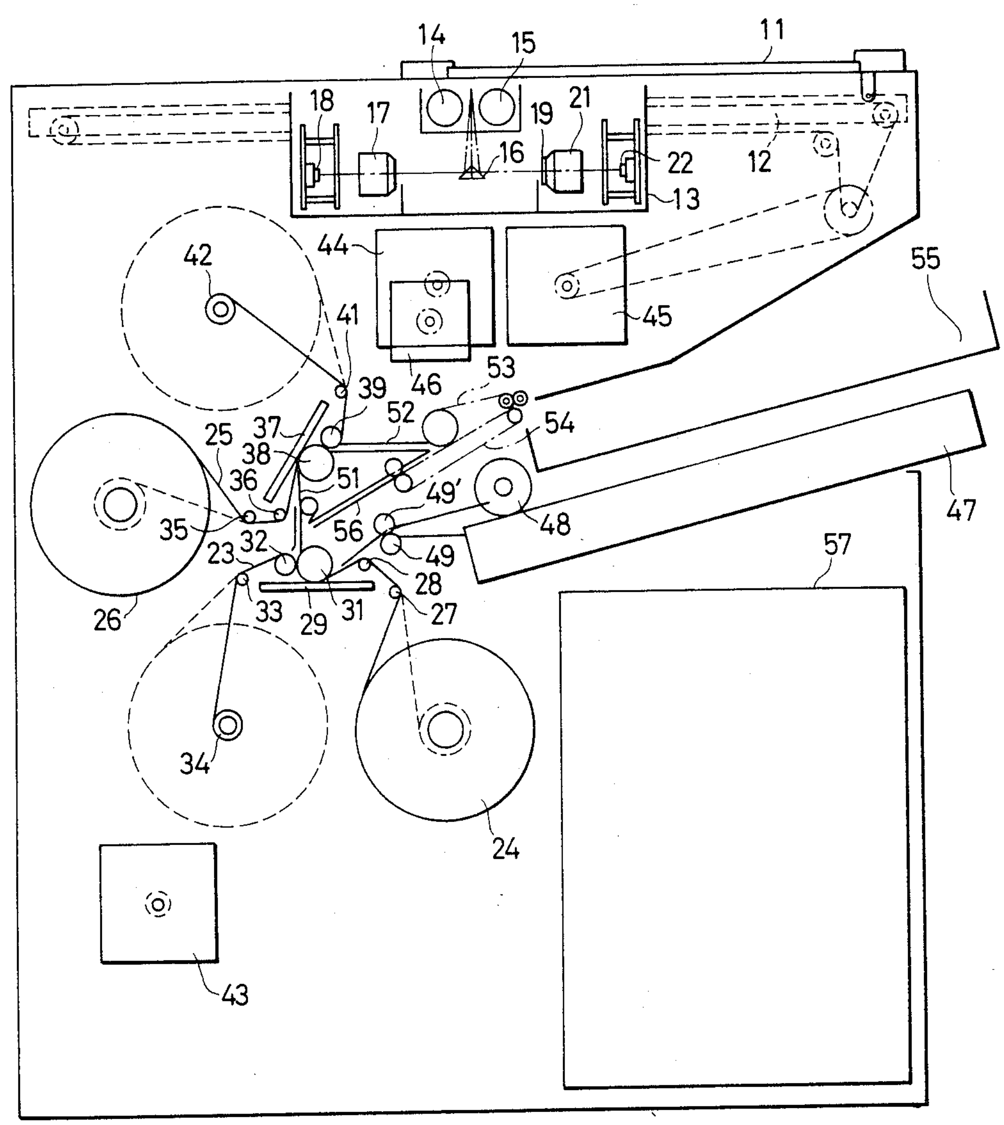
FIG. 3 is a schematic diagram outlining the arrangement of a multi-function copying machine in which data are recorded in two colors by a heat-sensitive recording system according to a preferred embodiment of this invention.

FIG. 3 shows the arrangement of a multi-function copying machine employing a heat-sensitive recording system according to the preferred embodiment of the invention. The copying machine has a picture reading section for reading picture data from a given original, and a recording section for recording an image in multiple colors or a single color according to the picture data thus read.

The picture reading section comprises: a platen 11 which is fixed to receive an original; and a scanner unit 13 which reciprocates on a rail 12 mounted in parallel with the platen 11. In the scanner unit 13, a pair of fluorescent lamps 14 and 15 slightly longer than the width of the platen 11 are provided in such a manner that they are spaced a predetermined distance from each other and are laid in a direction (in the main scanning direction) perpendicular to the direction of movement of the scanner unit 13. A reflecting mirror 16 is disposed below fluorescent lamps 14 and 15 so that light reflected from the original branches in two path directions. In one path the light beam is reflected by the reflecting mirror 16, a lens 17 forms an optical image and an image sensor 18 converts the optical image into an electrical signal. In the preferred embodiment, the image sensor 18 operates to read black picture data.

In the other path, the light beam is reflected by the reflecting mirror 16 through, a cyan filter 19 which absorbing red rays, a lens 21 converges the rays which have passed through the filter 19, and an image sensor 22 converts an optical image into an electrical signal. In the preferred embodiment, the image sensor 22 operates to read black and red picture data.

A circuit for processing picture signals outputted by the image sensors 18 and 22 is incorporated in the scanner unit 13. The scanner unit 13 is arranged to freely reciprocate on the rail 12.

The recording section comprises: a black printing supply roll 24 and a red printing supply roll 26. The black printing supply roll 24 is provided by winding a black ink donor sheet 23 (for printing in black) on a paper core, and the red printing supply roll 26 is provided by winding a red ink donor sheet 25 on a paper core. The black ink donor sheet 23 for the black printing supply roll is supplied through a guide rail 27 and a stress absorbing roll 28 to the gap between a black thermal head 29 and a black back roll 31. Thereafter, the black ink donor sheet 23 is passed through the black back roll 31 and a black drive roll 32 and through a guide roll 33 and is then wound on a black winding roll 34.

Similarly, the red ink donor sheet 25 from the red supply roll 26 is supplied through a guide rail 35 and a stress absorbing roll 36 to the gap between a red thermal head 37 and a red back roll 38. Thereafter, the red ink donor sheet 25 is passed through the red back roll 38 and a red drive roll 39 and through a guide roll 41. It is then wound on a red winding roll 42. A black printer motor 43 is provided to drive the conveying system of the black ink donor sheet 23 and similarly, a red printer motor 44 is provided to drive the conveying system of the red ink donor sheet 25.

A scanner motor 45 and a recording sheet motor 46 are disposed adjacent to the red printer motor 44. The scanner motor 45 is a step-motor which reciprocates the scanner unit 13 with the aid of belt means. The recording sheet motor 46 is a step-motor which supplies recording sheets piled on a paper feeder 47 to a thermal recording position with the aid of a paper feed roll 48. The recording sheet is supplied from the paper feeder 47. Following registration by register rolls 49, it is placed over the black ink donor sheet, so that it is recorded in black while passing through the black thermal head 29 and the black back roll 31.

A recording sheet switching section 51 for switching the path of advancement of the recording sheet is provided above the recording sheet which has passed through the black back roll 31 and the black drive roll 32. Therefore, when the recording sheet switching section 51 is ready for guiding upwardly the recording sheet which has been peeled off from the black ink donor sheet 32, the recording sheet is placed over the red ink donor sheet 25. Accordingly, red data are recorded on the recording sheet while the latter passes through the red thermal head 37 and the red back roll 38. Thereafter, the recording sheet is delivered into a paper catch tray 55 by a pair of conveying belts 53 and 54 after being guided by a guide 52.

When, on the other hand, the recording sheet switching section 51 is ready for guiding the recording sheet obliquely upwardly, the recording sheet is passed through a guide 56 whose inlet is upwardly arranged and is then delivered into the paper catch tray by the conveying belts 53 and 54. A housing 57 is provided below the paper feeder 47. The housing 57 incorporates the power source of the copying machine, and an electrical circuit.

The multi-function copying machine thus constructed and its copying operation will be described in more detail.

Figure 4:
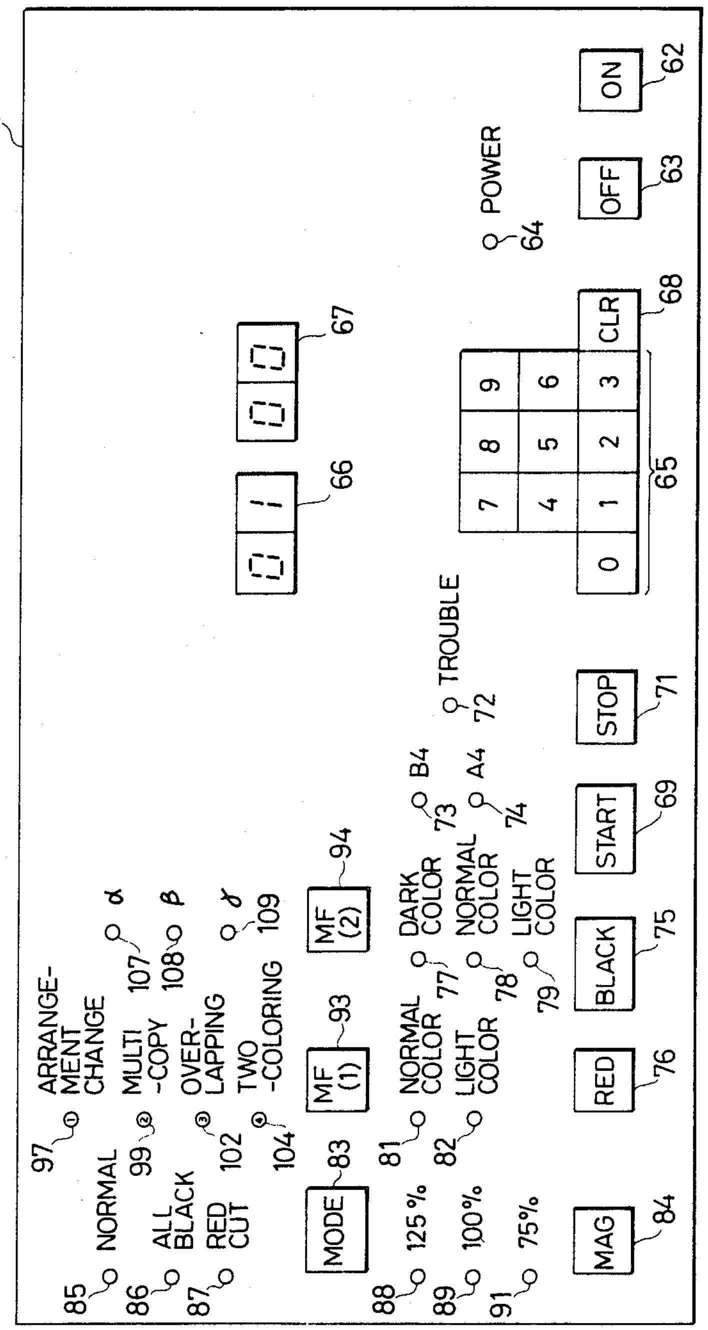
FIG. 4 is a plan view of the operating panel of the multi-function copying machine in FIG. 3.

FIG. 4 shows the operating panel of the multi-function copying machine in accordance with a preferred embodiment of this invention. A number of switches, a number of indicators and two sets of counters are utilized on the operating panel 61. A power "on" switch 62 and a power "off" switch 63 are respectively employed to turn on and off the power source. When the power "on" switch is operated, a power indicator 64 is illuminated, which in association with the operations of the other indicators, informs the operator of the fact that the copying machine is operable.

A numerical ten-key set 65 is a group of switches for setting the number of copies and specifying the position of an original. In setting the number of copies, the value is displayed by a set counter 66. An output counter 67 is disposed adjacent to the set counter 66. The output counter 67 successively displays the number of copies which have been made by the copying machine. Thus, when the contents of the counter 66 are equal to those of the counter 67, the recording operation is terminated. In order to change the number of copies displayed on the set counter, a clear button 68 is depressed, and then a desired number of copies is inputted by operating the numerical ten-key set 65. It should be noted that, when the ten-key set 65 is operated more than five seconds after the number of copies has been set in the set counter 66, the new number of copies is set in the set counter 66 even if the clear button 68 is not operated.

Where the functions unique to the copying machine of the preferred embodiment of this invention, such as a function of specifying the position of an original and a function of performing multiple copying are performed, data for positioning an original are displayed on the set counter 66 and the output counter 67. These displays are illustrated in FIG. 4.

A start switch 69 and a stop switch 71 are provided substantially at the middle of the operating panel. The start switch 69 is operated in order to start a copying operation, and the stop switch 71 is actuated when it is necessary to stop the operation of the copying machine. When the heat-sensitive recording sheet is jammed (or caught) in the copying machine, or when other problems or emergencies occur, the operation of the copying machine is stopped without operating the stop switch 71. In this case, an indicator 72 is illuminated to inform the operator of the occurrence of a problem. Until the operator depresses the clear button 68 after suitably dealing with the problem, the indicator 72 is maintained on and the copying machine is not operated even if the start switch 69 is actuated.

A size "B4" indicator 73 and a size "A4" indicator 74 are disposed above the start switch 69. In the copying machine, the width of a heat-sensitive recording sheet is detected by a recording sheet size switch (not shown). According to the width thus detected, it is determined whether the heat-sensitive recording sheets loaded in the device are of the size "A4" or of the size "B4" and the result of determination is displayed on the respective one of the two indicators 73 and 74. Furthermore, as will become apparent herein, the scanning length of the scanner unit and the recording width of the thermal head are automatically set, to reduce the consumption of electric power and to prevent the contamination of the rolls in the recording section which may be caused when unnecessary regions are printed.

A black density change-over switch 75 and a red density change-over switch 76 are provided to the left of the start switch 69. These switches are employed to delicately change the amount of heat generated in the thermal heads, to provide several steps of black and red recording densities, respectively. Indicators 77, 78 and 79 indicate "dark color", "normal color" and "light color", respectively. When the black density change-over switch 75 is repeatedly depressed, the indicators 77, 78 and 79 are lighted on in the stated order and recording density is set simultaneously. Similarly, when the red density change-over switch 76 is repeatedly operated, indicators 81 and 82 adapted to indicate "normal color" and "light color" are illuminated in the stated order, and a recording density is set simultaneously.

A mode selecting button 83 and a magnification setting button 84 are provided at the leftmost end of the operating panel 61. The mode selecting button 83 is a switch for selecting a recording color. As the mode selecting button 83 is depressed repeatedly, three color modes are selected one after another. When the "normal" mode is selected, a "normal" specifying indicator 85 is illuminated. In this color mode, red picture data are recorded in red, and black picture data are recorded in black. When the "all black" mode is selected, an "all black" specifying indicator 86 is illuminated. In this color mode, both red picture data and black picture data are recorded in black. When the "red cut" mode is selected, a "red cut" specifying indicator 87 is illuminated. In this color mode, black picture data are recorded in black, but red picture data are recorded (by being cut away).

The magnification setting button 84 is a switch for setting a copying magnification. When the magnification setting button 84 is operated repeatedly, copying magnifications 125%, 100% and 75% are cyclically selected. A selected copying magnification is displayed by the respective one of the indicators 88, 89 and 91.

First and second multi-function switches 93 and 94 for the functions unique to the copying machine of the invention are provided to the right of the mode selecting button 83. The first multi-function switch 93 operates to select any one of the functions which are performed by the copying machine. When the first multi-function switch 93 is depressed, a lamp incorporated therein is turned on to indicate that the copying machine is ready. When, under this condition, one of the keys "1" through "4" of the tenkey set 65 is depressed, a corresponding function is specified as follows:

(1) When the key "1" is depressed, an "arrangement change" indicator 96 is illuminated to show the execution of "arrangement change". The term "arrangement change" is intended to mean that, as in the case where a record picture 98 is formed by using an original 97 in FIG. 5, the positions of picture data are exchanged. In this example, the position of picture data "A B C" and the position of picture data "D E F" are exchanged for each other.

(2) When the key "2" is depressed, a multi-copy" indicator 99 is illuminated to indicate the execution of "multi-copy". The term "multi-copy" is intended to mean that, as in the case where a record picture 101 is formed by using an original 97 in FIG. 6, a portion of the picture data of the original is recorded at a number of positions. In this example, picture data "A B C" is recorded at a position where picture data "D E F" should be recorded and again repeated at the position corresponding to "G H I".

(3) When the key "3" is depressed, an "overlapping" indicator 102 is illuminated to indicate the execution of "overlapping". The term "overlapping" is intended to mean that, as in the case where a record picture 103 is formed by using an original 97 in FIG. 7, a portion of picture data is overlapped with another portion of the picture data. In this example, picture data "A B C" is overlapped with picture data "D E F".

(4) When the key "4" is depressed, a "two-coloring" indicator 104 is illuminated to indicate the execution of "two-color copying". The term "two-color copying" is intended to mean that, as in the case of forming a record picture 105 by using an original 97 in FIG. 8, a portion of the original is changed from "black" to "red". In this example, the color of picture data "D E F" is changed into red as indicated by the dotted line in picture 105.

When the first multi-function switch 93 is again depressed, the function is turned off and simultaneously the indicator 97, 99, 102, and 104 which has been selectively illuminated is also turned off. As a result, the copying machine is restored to perform its ordinary functions.

The second multi-function switch 94 is turned on and off in specifying data inputs which are necessary for performing a special function which is selected. Three operation specifying indicators 107, 108 and 109 are disposed above the second multi-function switch 94. According to the "on" states of these indicators, the operator operates the ten-key set 65 to input necessary data. The data thus inputted are displayed on the set counter 66 and the output counter 67.

The ordinary functions of a multi-function copying machine are well known. By way of example, to compare the features of the present invention, the "arrangement change" function, which is unique to the copying machine of this invention, will be described in more detail.

First, the operator depresses the power "on" switch 62 on the operating panel 61, whereupon the power indicator 64 is turned on while current is supplied to the copying machine. In this condition, the operator depresses the first multi-function switch 93 and then the key "1" of the ten-key set 65, to illuminate the "arrangement change" indicator 97. At the same time, the second multi-function switch 93 starts turning on and off, and the operation specifying indicator 107 is illuminated.

Figure 5:
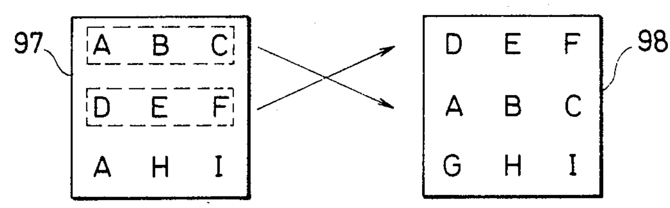
FIG. 5 is an explanatory diagram showing an example of an "arrangement change" operation.
Figure 9:
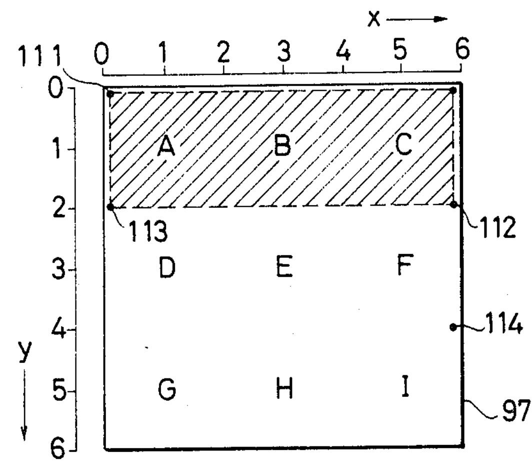
FIG. 9 is an explanatory diagram for a description of a position data inputting operation in editing the picture data of an original.

It is assumed that the positions of data are exchanged for each other as shown in FIG. 5. In this case, the operator inputs the original position data of a region "A B C" which is subjected to arrangement change. In other words, as shown in FIG. 9, the x-y coordinates (0,0) of the upperleft point 111 and those (6,2) of the lower-right point 112 of the region "A B C" which is shaded by oblique lines are inputted with the ten-key set 65. The coordinates of the point 111 are displayed on the set counter 66, while the coordinates of the point 112 are displayed on the output counter 67.

When this position data has been inputted, the operation specifying indicator 108 is illuminated. In this condition, the operator inputs position data which are effective after the arrangement change. In this case, the region "A B C" is replaced by the region "D E F". Therefore, in this case, the x-y coordinates of the upper-left point 113 and the lower-right point 114 of the original region "D E F" are inputted. More specifically, coordinates (0,2) and (6,4) are inputted with the ten-key set 65 and are displayed on the set counter 66 and the output counter 67, respectively.

When the data for arrangement change have been inputted as described above, the "normal color" indicator 78 is turned on to set its black density, and the "100% (life size)" indicator 98 is turned on to set the copying magnification. Depending on the conditions of an original and a recording sheet, the above-described setting may be changed. In such a case, the operator carries out the necessary operations. After the above-described operations have been conducted successively, the operator places an original on the platen 11 (FIG. 3), and then depresses the start switch 69, so that a recording operation for arrangement change is started.

Figure 1:
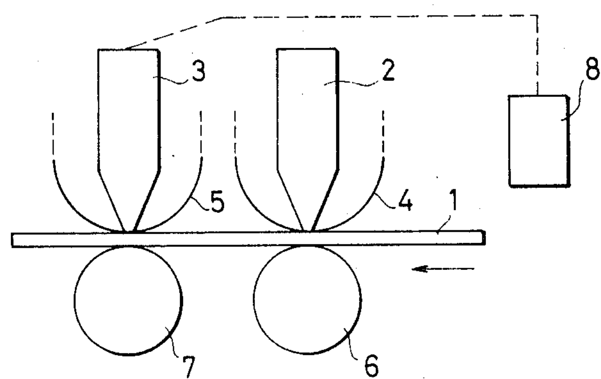
FIG. 1 is an explanatory diagram outlining the arrangement of the recording section of a conventional two-color recording type copying machine.
Figure 10:
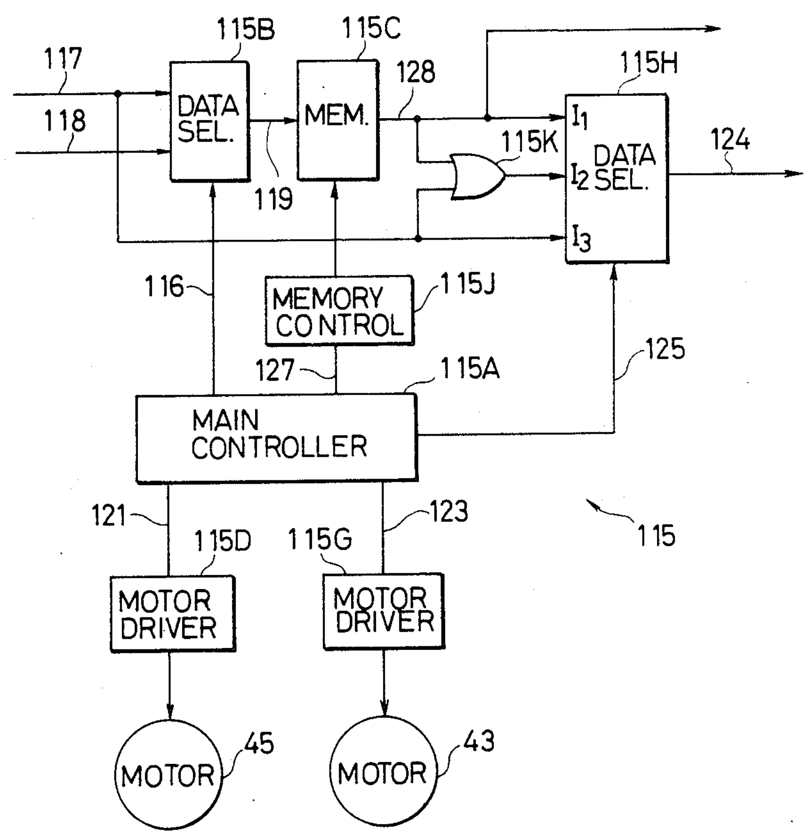
FIG. 10 is a block circuit diagram of an editing circuit in accordance with this invention.

FIG. 10 is a portion of the essential components of the editing electrical circuit in the multi-function copying machine in accordance with this invention. When arrangement change is specified, a main controller 115A in the electrical circuit 115 supplies a black signal selection signal 116 to a first data selector 115B. The output picture signal of the scanner unit 13 is processed to provide a black signal 117 and a red signal 118, which are applied to the first data selector 115B. Under the condition that the black signal selection signal 116 is inputted to the first data selector 115B, it supplies the black signal, as a selection output signal 119, to a picture signal memory 115C. This memory functions in a manner similar to memory 8 in FIG. 1 for picture data storage.

It is assumed that the multi-function copying machine has selected a copying magnification of 100% (life size). In this case, the main controller 115A converts the x-y coordinates representing the original region "A B C" into the actual length of the original, to supply an auxiliary scanning specifying signal 121, representing the auxiliary scanning width, to a motor driver 115D. As a result, the scanner motor 45, which is a step-motor, is driven stepwise whereby the scanner unit 13 starts reading the region "A B C". The black signal 117 which is obtained as a result of the reading is stored in the large-capacity memory 115C. At the position where reading the region "A B C" has been accomplished, driving the scanner motor 45 is stopped, and accordingly, the scanner unit 13 is stopped at that position.

When the picture data of the region "A B C" have been stored in the memory 115C as described above, the main controller 115A starts the ordinary recording operation of the region "D E F". The paper feed roll 48 (FIG. 3) is driven to feed only one of the recording sheets stacked on the paper feeder 47. The recording sheet is delivered through the pair of register rolls 49 and 49'. When the front edge of the recording paper thus delivered comes near the black thermal head 29 and the black back roll 31, the main controller 115A applies a black ink donor sheet conveying signal 123 to a black motor driver 115G, so that the recording sheet is passed over the black thermal head 29 while being held between the black ink donor sheet 23 and the black back roll 31 by means of drive motor 43.

The internal timing establishes that the recording sheet has passed over the black thermal head 29, and then, the main controller 115A outputs the auxiliary scanning specifying signal 121. The main controller 115A also supplies a control signal 125 to a second data selector 115H, to cause it to select a signal, as an output signal 124. If applied to the third input terminal $I_3$, the black signal 117 is supplied, as the output signal 124 to the black thermal head 29 so that the region "D E F" is recorded on the top of the recording sheet (FIG. 5). When the region "D E F" has been recorded as described above, the main controller 115A suspends the application of the auxiliary scanning specifying signal 121, to stop the scanner unit 13.

At the same time, the main controller 115A supplies a read/write control signal 127 for specifying a read state to a memory controller 115J, to cause the memory 115C to output a memory read signal 128. Furthermore, the main controller 115A applies the control signal 125 to the second data selector 115H, so that a signal supplied to the first input terminal $I_1$ is provided as the output signal 124. In this case, the black signal corresponding to the region "A B C" is supplied, as the output signal 124, to the black thermal head, and is recorded at the middle of the recording sheet (FIG. 5).

When the region "A B C" has been recorded, the main controller 115 again outputs the auxiliary scanning specifying signal 121. In this case, the application of the read/write control signal is suspended, and the control signal 125 is applied to the second data selector 115H to select a signal applied to the first input terminal $I_1$. Accordingly, the scanner unit 13 scans the remaining region "G H I", and the region "G H I" is recorded at the bottom of the recording sheet (FIG. 5).

The recording sheet on which the image of the original has been recorded with the positions of data transposed, is guided by the guide 56 and is delivered into the paper catch tray 55 by the conveying belts 53 and 54.

Figure 6:
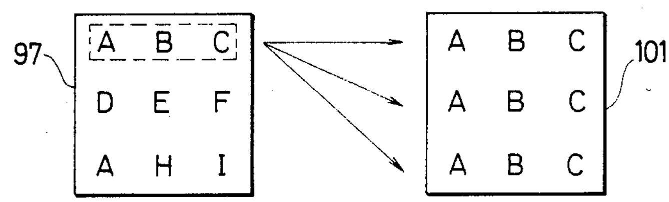
FIG. 6 is an explanatory diagram showing an example of a "multi-copying" operation.

With respect to the other functions, the operations of the multi-function copying machine will be briefly described. When the "multi-copy" function as shown in FIG. 6 is selected, the ten-key set 65 is operated to input the position data of a region which is subjected to "multicopying". It is assumed that the "multi-copying" of the region "A B C" is carried out. When the region is read, the region is recorded while being stored in the memory 115C. In the next step, the reading operation is not carried out, but the output signal 124 is outputted by the memory 115C. This operation is repeatedly carried out. Thus, the "multi-copying" is accomplished.

Figure 7:
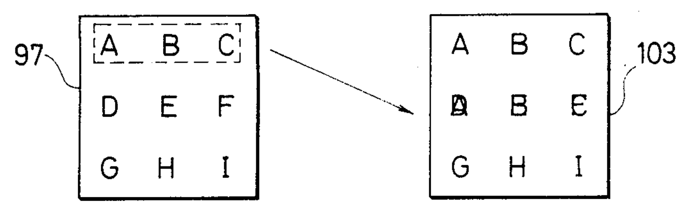
FIG. 7 is an explanatory diagram showing an example of an "overlapping" operation.

When the "overlapping" function as shown in FIG. 7 is selected, the ten-key set 65 is operated to input the position data of regions which should be overlapped with each other. It is assumed that the regions "A B C" and "D E F" are overlapped with each other at the position of the region "D E F". In this case, the signal at the second input terminal $I_2$ of the second data selector 115H is selected. As a result, the memory read-out signal 128 of the region "A B C" written in the memory 115C and the black signal 117 as to the region "D E F" are overlapped with each other by an OR circuit 115K and are recorded.

Figure 8:
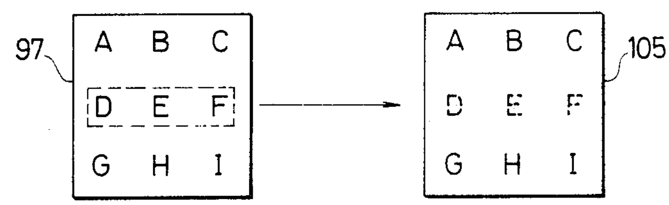
FIG. 8 is an explanatory diagram showing an example of a "two-color" operation.

When the "two-color copying" function as shown in FIG. 8 is selected, the ten-key set 65 is operated to specify a portion of the original which is to be recorded in red. The picture signal of this portion is applied only to the memory 115C. That is, it is not supplied as the output signal 124 to the black thermal head 29. In this case, the read/write control signal 127 for specifying a read state is outputted with predetermined timing, and the memory readout signal 128 is supplied to the red thermal head 37. The recording sheet is guided obliquely upwardly by the recording sheet switching section 51. After recording has been made in red with the red ink donor sheet 25, the recording sheet is delivered into the paper catch tray 55.

Figure 2:
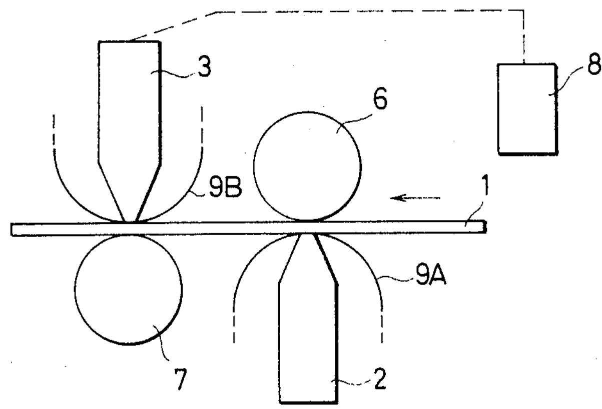
FIG. 2 is an explanatory diagram outlining the arrangement of the recording section of a conventional copying machine which records data on two sides of a recording sheet.

The duplicating of this system for scanning and recording on the second side will be apparent to one of ordinary skill given the basis of two-sided copying in FIG. 2. Thus, scanning a second side of an original, in accordance with known techniques can employ the same scanner with the original "flipped over" during its path for a second scan. Copying a second side of a recording sheet using the features of this invention will be apparent by the appropriate placement of recording heads vis-a-vis the paper path.

As is apparent from the above description, according to the invention, the copying machine in which data are recorded in multiple colors or on both sides of a recording sheet according to the raster scanning system can have a picture data editing function such as the picture data rearranging function merely by the additional provision of the circuit and mechanism as described above. Thus, the copying machine can be remarkably improved in its utility while the invention has been described relative to one preferred embodiment thereof, it is apparent that modification is possible without departing from the essential scope of this invention.

We claim:

1. A multi-function copying machine comprising:

reading section means for reading data on an original by raster scanning and producing electrical picture signals for each color scanned;

recording means for performing recording at different recording positions, said recording means receiving said picture signals and applying said picture signals, representing each color scanned for multi-color recording, to a recording media;

control means for controlling the timing of delivery of said picture signals applied to said recording means;

editing means for selectively actuating said reading section means and for setting the timing of the delivery of a portion of said picture signals provided by said reading section means to said recording means, for editing picture data of the original; and memory means for delaying the timing of delivery of said portion of said picture signals provided by said reading section means to said recording section as a function of the timing of the delivery set by said control means and said editing means.

2. The multi-function copying machine of claim 1, wherein said reading section means comprises a stationary platen to receive said original, a movable scanner having means to illuminate said original, means to transmit light reflected from said original and image sensor means receiving said reflected light and converting it into an electrical input signal and means to reciprocate said scanner relative to said platen.

3. The multi-function copying machine of claim 2, wherein said means to transmit light comprises a reflecting mirror dividing reflected light into two paths, a first lens for forming an image of reflected light from one path onto a first image sensor of said image sensor means, a filter for absorbing light in a predetermined wavelength from reflected light from a second path, and a second lens receiving said absorbed light and forming a second image onto a second image sensor of said image sensor means.

4. The multi-function copying machine of claim 2, wherein said means to reciprocate said scanner comprises a rail for guiding said scanner, a reversible stepper motor and means coupling said scanner to said stepper motor.

5. The multi-function copying machine of claim 1, wherein said recording means comprises a pair of supply rolls for delivering at least two different color rolls for printing, at least one recording head for each of said colors, guide means for passing each supply roll to a position opposite its respective recording head; said recording media further comprising a supply of recording sheets, means to guide a recording sheet into contact with one color roll as it is positioned opposite to a first recording head, means for gating said recording sheet either to a receiving tray following signal color recording or for positioning said recording sheet into contact with a second color roll as it is positioned opposite to a second recording head for recording in a second color, and means for guiding said recording sheet into said receiving tray following recording in a second color.

6. The multi-function copying machine of claim 5, wherein said means for gating comprises a movable guide receiving said recording sheet and guiding it either to a first fixed guide for directing said recording sheet to said receiving tray or a back roller for urging said recording sheet into contact with said second color roll.

7. The multi-function copying machine of claim 6, further comprising a conveyor receiving said recording sheet from either said first fixed guide or from a second fixed guide directing said recording roll off said back roller, said conveyor moving and depositing said recording sheet in said receiving tray.

8. The multi-function copying machine of claim 1, wherein said control means comprises a first data selector receiving said electrical input signals from said reading section means; a main controller responsive to an operator command to select an input signal from said data selector for printing; memory means receiving said selected input signal; a motor driver for driving said reading section in accordance with the region of said original to be scanned as a function of an output from the main controller and; a second data selector receiving an electrical input signal and a memory output and responsive to said main controller to produce an output indicative of data to be printed at a predetermined position on a recording sheet.

9. The multi-function copying machine of claim 8, further comprising logic means for combining said electrical input and said memory output and producing a combined signal to said second data selector for overlapped printing.

10. The multi-function copying machine of claim 8, further comprising memory control means interposed between said main controller and said memory means for controlling the output of said memory means.

11. The multi-function copying machine of claim 1 wherein said recording means receives picture signals representing both sides of the original and applies said picture signals to each side of said recording media.

* * * * *